United States Patent [19]

Cochran et al.

[11] Patent Number: 5,116,216
[45] Date of Patent: May 26, 1992

[54] APPARATUS FOR PREPARING THERMOPLASTIC COMPOSITES

[75] Inventors: Roland C. Cochran, Glenside; Edwin L. Rosenzweig, Warrington, both of Pa.

[73] Assignee: The United States of America as represented by the Secretary of the Navy, Washington, D.C.

[21] Appl. No.: 662,678

[22] Filed: Feb. 28, 1991

[51] Int. Cl.⁵ .................. B29C 43/56; B32B 31/20
[52] U.S. Cl. ..................... 425/504; 156/286; 156/382; 264/102; 264/553; 264/DIG. 78; 425/388; 425/405.1; 425/DIG. 60
[58] Field of Search ............. 156/381, 382, 285, 286; 264/101, 102, 553, 571, DIG. 78; 425/388, 389, 405.1, 504, DIG. 60

[56] References Cited

U.S. PATENT DOCUMENTS

| | | |
|---|---|---|
| 3,837,965 | 9/1974 | Mahon et al. ................ 156/382 |
| 4,283,242 | 8/1981 | Regler et al. ................ 156/382 |
| 4,357,193 | 11/1982 | McGann et al. ............. 156/286 |
| 4,421,589 | 12/1983 | Armini et al. ................ 156/382 |
| 4,504,341 | 3/1985 | Radzwill et al. ............. 156/286 |
| 4,652,319 | 3/1987 | Hammond .................. 156/382 |
| 4,681,651 | 7/1987 | Brozovic et al. ............ 156/382 |

*Primary Examiner*—Jay H. Woo
*Assistant Examiner*—James P. Mackey
*Attorney, Agent, or Firm*—James V. Tura; James B. Bechtel; Susan E. Verona

[57] ABSTRACT

An apparatus for processing thermo-composites is disclosed where individual plies of a prepreg, to be formed into a laminate, are processed under two, concentric vacuum chambers. Heat and consolidating pressure are applied under a first vacuum to the material and then a second vacuum is drawn under an outer, rigid shell.

9 Claims, 4 Drawing Sheets

APPARATUS FOR PREPARING THERMOPLASTIC COMPOSITES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Presently, parts made from commercial, fiber-reinforced composites or laminates use vacuum-bag or press molding of plies of prepregs containing fibers and polymeric resins. Historically these composites were composed of thermosetting resins. The individually impregnated plies or layers of prepregs were consolidated by the application of heat and pressure by vacuum-bag molding and compaction in an autoclave. In recent years, thermoplastic polymers have been developed which have some benefits over thermoset polymers. The main differences between the two systems are that thermosets require curing, while thermoplastics only require melting, thus saving time, and thermoplastics offer improved damage tolerance.

The aircraft industry, for example, forms fiber-reinforced, thermoplastic resin matrixes into composite parts or structures for the construction repair of aircraft sections such as wing parts. This involves processing the composites at elevated temperatures and pressures for a set length of time. The length of time required to properly consolidate a part determines the production rate for that part and it is most desireable to achieve the best consolidation in the shortest amount of time. High temperatures are required to reach the melting point of the resin and transform the individual plies of prepreg into a fully consolidated solid laminate. High consolidation pressures, from about 100 to 300 psi, through the use of an autoclave, are needed to provide the force required to consolidate the plies and remove any defects, such as voids found in a laminate and driving portions of the volatiles into solution. Voids are usually caused by the inability of the resin to displace air from the fiber surface during the time the fibers are coated with the liquid resin. Voids may also be caused by air bubbles and volatiles entrapped within and between the plies before consolidation. Volatiles may also appear because of moisture in the prepreg or volatile material in the resin, etc.

In processing thermoplastic resin composites, comprising a poly-ether-ether-ketone or polyether sulfone etc., the industry has always relied on an autoclave or a press, to provide the required pressures. Autoclaves and presses are large, expensive pieces of equipment and cannot always provide void-free laminates or composites. The size, weight and cost of an autoclave prevents it from being used in the field at maintenance locations or smaller manufacturing sites. The lack of this important equipment limits these sites in being able to fabricate aircraft sections and/or repair and maintain aircraft in the field where there is a need to custom make void-free and volatile-free laminates.

For instance, one sealing system used for the manufacture of composite or laminated structures in a mold is disclosed in U.S. Pat. No. 4,681,651 to Brozovic et al. entitled "Vacuum Bag Sealing System". This patent discloses a sealing system for composite structures that must then be placed in an autoclave for final curing. Here, the system uses a single vacuum bag and comprises a base plate for mounting the mold and sheets of composite material, a first TEFLON, or other non-adhering substance, coated sealing surface bonded to said plate, a vacuum bag having another sealing surface and adhesive means for detachably sealing said first and said second surfaces to form an airtight seal. The single bag system is intended for use in an oven or autoclave cure.

Another patent, U.S. Pat. No. 4,504,341, entitled "Fabricating Shaped Laminated Transparencies" by John Radzwill et al. describes a method of simultaneously shaping and laminating rigid plies of acrylic or polycarbonate polymers with an interlayer of either polyurethane or polyvinyl butyral. The patent teaches that layers to be laminated are assembled into a stacked array and placed in a first flexible cell. Once the cell is completely formed it is evacuated by connection to a first vacuum source and it is then laid over the upper facing surface of a vacuum mold. A second, flexible bag is placed over the cell, the cell heated to a temperature of 210° F., and a second vacuum drawn. Once the cell has conformed to the shape of the vacuum mold, the temperature is reduced until the shape of the assembly is set and then the various vacuums discharged simultaneously. This method, however, does not allow for the use of thermoplastic prepregs. Moreover, this method utilizes a large vacuum differential and therefore allows edges of the individual plies to be pinched off, thereby preventing complete removal of volatiles as soon as the second vacuum is drawn. In addition, this system will only work with polymeric prepregs at temperatures of approximately 210° F.

SUMMARY OF THE INVENTION

It is therefore an object of the present invention to provide an apparatus and process that will consolidate fiber-reinforced thermoplastic prepregs into laminates or composites without the need for an autoclave.

It is a further object of the present invention to provide an apparatus that is lower in cost than an autoclave and that is relatively light-weight and highly portable.

It is a still further object of the present invention to provide a light-weight and highly portable apparatus that utilizes two independent vacuum chambers to achieve the consolidation of fiber-reinforced thermoplastic resin prepreg into reinforced laminates or composites.

It is still a further object of the present invention to provide an apparatus and process wherein the polymeric resin within the plies of prepregs is processed uniformly to a specified degree of consolidation in the shortest possible time and with the lowest possible void content.

These and other objects of the invention are achieved by employing a double-vacuum chamber apparatus that allows fabrication of fiber-reinforced laminates without the need for an autoclave or press. The apparatus and process of this invention removes trapped air and volatiles from the plies and causes said plies to consolidate. In general, the desired stack of plies is set on a solid surface and an edge dam of steel or other suitable material is placed therearound. The edge dam is placed in such a manner as to allow a ¼" gap between the plies and the dam. An optional plate is set on top of the plies and a heating element placed adjacent the stack. A breather ply is laid over the heating element to extend over a first adjacent vacuum port. Next a pliable or flexible bag forming an inner vacuum chamber is hermetically sealed and joined to the surface. A rigid outer vacuum chamber having a second port therethrough is placed over the assembly, i.e. inner vacuum chamber, such that the edges of the flexible bag protrude therefrom, and edges of the rigid chamber are sealed to the top surface of the first vacuum bag. Vacuums are drawn from both the inner and outer chambers, with the inner chamber being maintained at absolute pressure level at or below the level of pressure in the outer chamber, and the heating element is brought to a temperature ranging up to about 800° F. e.g. 600° to 750° F. for about 30–45 minutes depending on the melting point of the resin. After a predetermined period of time to remove air and volatiles without pinching off the edges of the stack, the outer chamber is vented to ambient or atmospheric pressures to create a pressure differential over the inner chamber i.e. flexible bag, thereby allowing consolidation and formation of the laminate. The laminate is cooled to below its softening temperature before the inner vacuum chamber is vented to atmosphere.

The novel features which are believed to be characteristics of the invention, both as to its organization and methods of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description and are not intended as a definition of the limits of the invention.

DETAILED DESCRIPTION OF THE PREFERRED EMBODIMENT

Figure 1:
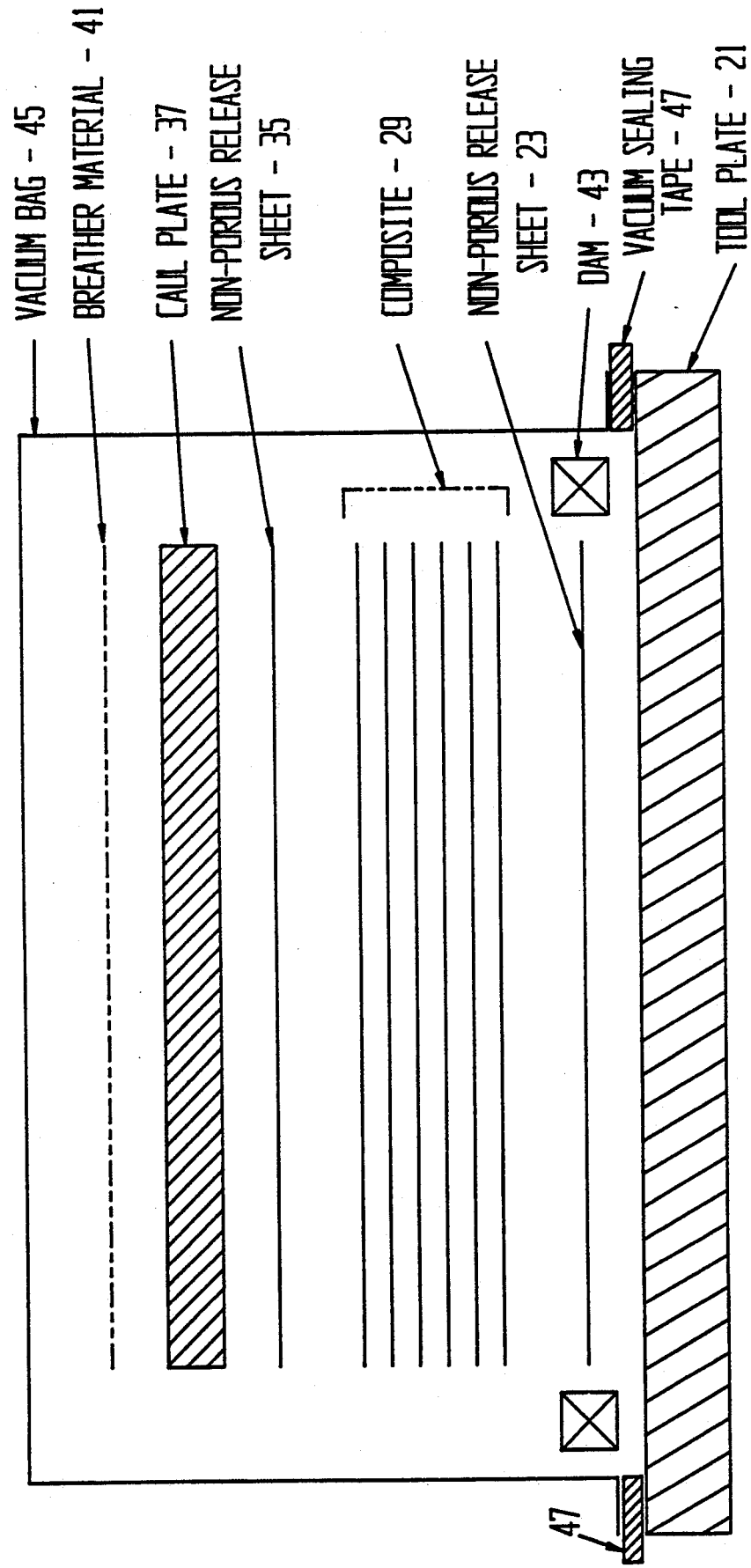
FIG. 1 is a schematic depiction of a prior art apparatus (minus the autoclave) used to consolidate a plurality of thermoplastic resin prepregs.

In the prior art, one method of preparing thermoplastic laminates or composites, as illustrated in FIG. 1, involves a single-bag molding process, and an autoclave (not shown), which is a complex pressure vessel to impart a vacuum, heat and pressure to prepregs during consolidation. As generally understood, the starting material for the bag-molding process is typically several plies of prepreg, such as APC2 (from ICI/Fiberite Company), that comprises fibers in a thermoplastic resin. A base surface, such as a ceramic or steel tool plate 21 is covered with a non-porous, release-film separator 23 (used to prevent sticking in the mold), and a plurality of plies 29, i.e. the prepreg, are set thereon. The plies are placed adjacent one another in the desired fiber orientation angle as well as in the desired sequence. A single ply of prepreg such as APC2, for instance, is 0.005 inches thick and can be cut into any desired shape. Plies 29 can be trimmed from a prepreg roll into the desired planform shape, size and orientation by means of a cutting device known in the art. Plies 29 can be stacked by hand or by machine.

After the lay-up operation is completed, a second non-porous release sheet 35 is placed thereupon. Finally a plate 37 and a breather sheet 41 are placed on the lay-up. An edge-dam 43, such as steel bars, surrounds the completed lay-up, which is covered by a thin, heat-resistant, vacuum bag 45, made from an air impervious diaphragm, and sealed to the base plate using vacuum sealing tape 47. The entire assembly is placed inside a autoclave (not shown in FIG. 1) where the assembly is heated to temperature and maintained at pressures up to 300 psi for the length of time required to consolidate. This process consolidates and densifies separate plies of prepregs into a solid laminate which may be used to repair structures such as aircraft. A patch made in an autoclave must be assembled to the structure with an autoclave or voids will occur, if volatiles come out of solution causing a weakness in said patch. As the lay-up is heated in the autoclave, the resin viscosity in the plies first decreases, then attains a minimum. However, a portion of the gaseous volatiles therein will diffuse from the resin and be removed by the vacuum. The remaining volatiles will be dissolved in the resin. Over time, in a vacuum atmosphere, these volatiles remaining within the resin will diffuse out and can, for instance, become deposited on critical parts such as telescopic lenses and photovoltaic cells.

Figure 2:
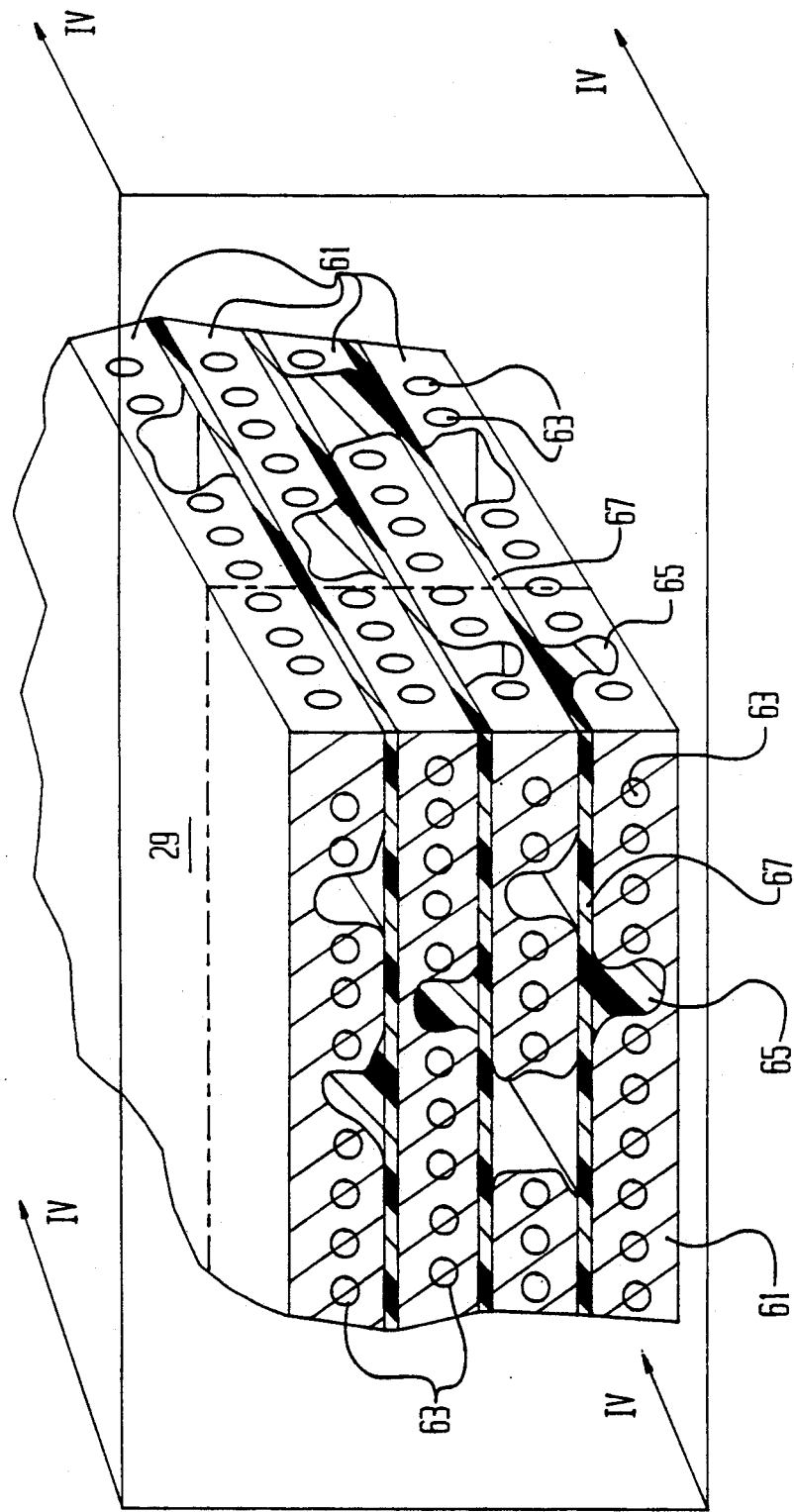
FIG. 2 is a schematic depiction of multiple plies of a composite prepreg before they are consolidated or laminated in the double-vacuum chamber apparatus of this invention.

In comparison to the prior art, the apparatus and process of this invention uses a plurality of plies of prepreg 61, as shown in FIG. 2, comprising a thermoplastic resin having multiple fibers 63 embedded therein. In order for these individual plies 61 to be effectively bonded into a composite or laminate 29, all voids 65 and volatiles 67 must be removed before they can be consolidated.

Figure 3:
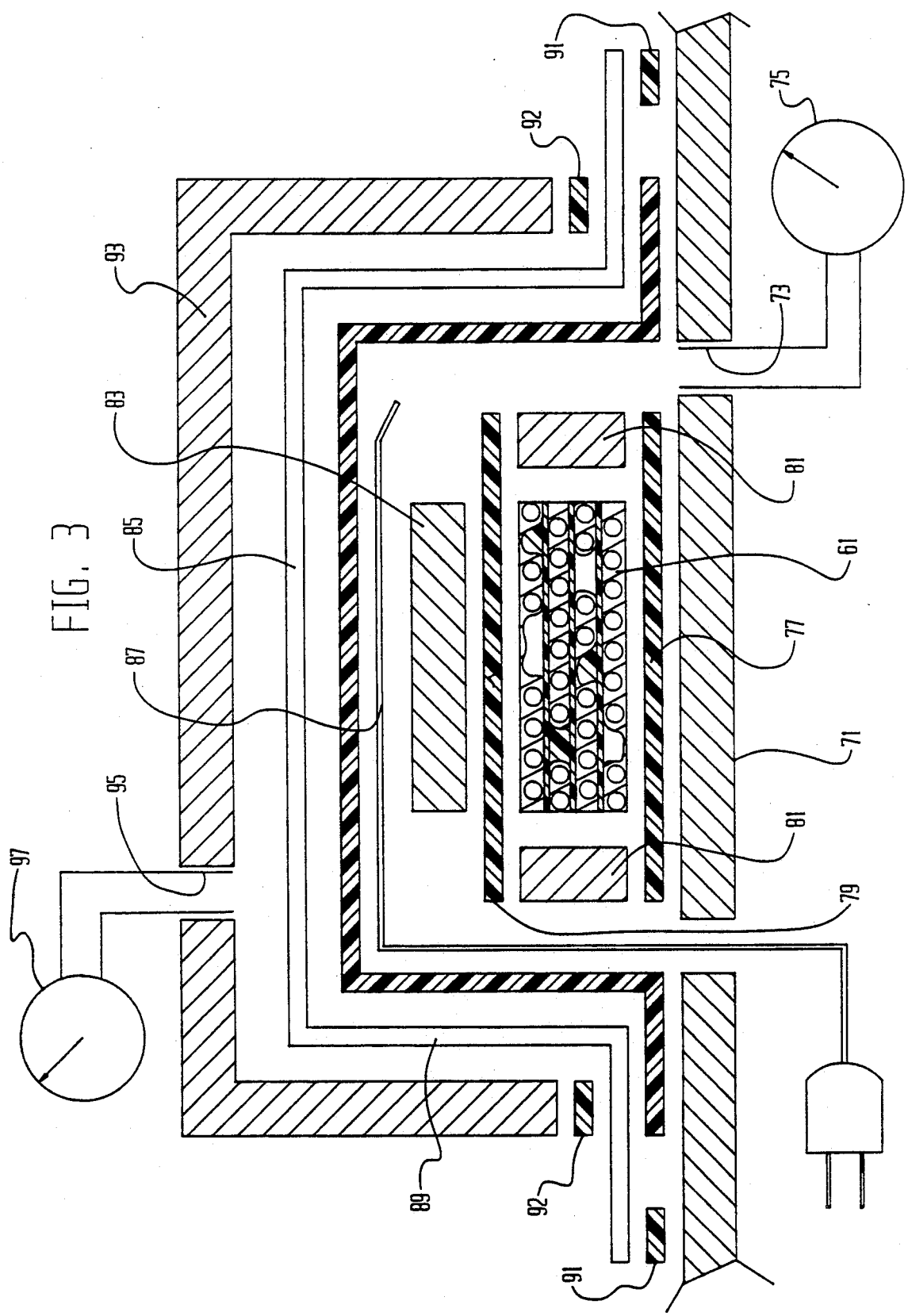
FIG. 3 is a schematic depiction of the double vacuum chamber apparatus of the instant invention.

More specifically, the instant invention as shown schematically in FIG. 3 requires two substantially independent, low-pressure vacuum chambers capable of high-temperatures to remove trapped gases and other volatiles from the prepregs 61. The apparatus of this invention has a base 71, made of steel, ceramic or other similar material, and either a flat or a curved surface of predetermined planar dimensions, with an aperture 73 therein, to which the inner vacuum depicted by gauge 75, is connected. A high temperature film release layer 77, e.g. polyimide film, is spread over plate 71 and multiple layers of prepreg 61 set thereupon. A second release layer 79 is set atop the layers of prepregs 61 and an edge dam 81 is placed totally therearound, leaving a gap of about 0.25 inches between the outer periphery of the layers of prepregs and the inner-facing surface of the edge dam. Edge dam 81 can be made of steel bars such as "1025" steel alloy, or other suitable materials.

A smooth-surfaced thin plate 83 that covers only the upper surface area of the lay-up may be optionally added. A heating element 87 consisting of a resistance wire-mesh incorporated in a rubberized covering, which is known, is now placed over the plate and connected to a standard device to provide heat with means to control the temperature e.g. up to 800° F. A large sheet or sheets of glass fibers cloth 85, either woven or non-woven, may be placed over element 87 and aperture 73 to act as a breather and thermal insulating layer.

A vacuum bag 89, consisting of a flexible sheet of polyimide approximately 3 mils thick, is placed over the breather 85 such that it extends out to near the periphery of base plate 71 and over vacuum aperture 73, thereby creating an inner chamber that totally covers the layers or plies of prepreg 61 and edge dam 81. As shown, bottom sections of high-temperature vacuum sealing tape 91 placed against plate 7 and the peripheral edges of the flexible vacuum bag 89 are extended thereover and sealingly attached thereto.

An outer-rigid vacuum chamber 93, consisting of steel etc., open-ended box, is set over the entire lay-up so that the underside edges of the box, having additional sections of sealing tape 92 secured thereto, fit securely and firmly onto the upper surface of the flexible bag 89 thereby ensuring that a hermetically sealed second vacuum chamber is formed between the outer surface of the flexible bag i.e. inner chamber, and the rigid chamber 93 and allowing the peripheral area of bag 89 to extend therebeyond. An aperture 95 connects into the outer chamber 93 thereby formed to allow connection of a second vacuum, as shown by gauge 97.

As an example of how the apparatus and process of the instant invention is designed to operate, a plurality or several plies of prepregs 61 to be fashioned into a composite or laminate 29, consisting of twenty-four layers of poly-ether-ether-ketone (PEEK) prepreg with surface dimensions, for example, of 9 inches long by 6 inches wide by 0.125 inches thick and with said plies being oriented in longitudinal direction is placed on a section of a coated polyimide film having a release agent on top of steel base plate 71. A second, high-temperature film release layer 79 is placed atop prepreg 61 and then an edge dam 81, consisting of steel bars equal in height to the stack of prepreg 61, is placed on base plate 71, entirely around prepreg 61, leaving a 0.25 inch gap between the inner circumference of the bars and the edges of plies 61. Next, a plate 83 of aluminum 0.032 inches thick is placed on top of the film 77 and plies 61. A heating element 87, connected to a suitable source of power, such as the 750° F. blanket made by the Brisk Heat Company, is placed on the stack and then a properly sized section of glass fibers fabric breather material 85 is placed over element 87, to extend far enough over the base plate 71 to cover the first vacuum port 73 of the chamber formed by the polyimide film 89.

The next step involves forming the inner vacuum chamber by placing the flexible bag 89, comprising a 3 mils thick sheet of polyimide film (also known in the trade as UPILEX film), entirely over the assembled stack and breather material 85 so that it can be hermetically sealed to plate 71, with vacuum sealing tape 91. Further sections of vacuum sealing tape 92 are applied to the bottom mating edges of rigid box 93 and the entire assembled lay-up so that its edges fit securely, air-tightly and firmly on to the upper surface of bag 89. This creates the outer chamber which is connected, through port 95, to a second vacuum 97.

A first vacuum, of about 25 to 50 Torrs of absolute pressure or below, i.e. a very high vacuum of about 28 inches of $H_g$ below atmospheric pressure is drawn in the first flexible chamber under bag 89. Simultaneously, a second vacuum substantially equal to 100 Torrs absolute pressure or below i.e. a lower vacuum of about 26–27 inches of $H_g$ below atmospheric is drawn under rigid chamber 93. In this step, it is important to maintain a higher vacuum, i.e. less pressure, under the first, inner chamber than under the outer chamber, so that there always will be a slight pressure, due to the stronger vacuum in the inner chamber, bearing on the flexible inner chamber or bag 89. It is important that at all times during the process, the vacuum the inner chamber e.g. about 2.0 inches of $H_g$ less than the vacuum in the inner chamber. Heat is applied by means of element 87 to obtain the process temperature of at least above the melting point of the resin, for example 720° F. for PEEK. Upon reaching the process or melting temperatures of the resin, a dwell is initiated for the proper length of time depending on the particular resin in the prepreg e.g., up to 60 minutes or more for PEEK. After 30 minutes or more of dwell time, the vacuum in the rigid outer chamber is vented to ambient pressures e.g. atmospheric pressure and the remaining 30 minutes of dwell is continued while maintaining the vacuum under the flexible bag or inner chamber. The dwell time of the first stage allows volatiles to escape from the laminate along the edges without pinching-off the diffusion path within the laminate. The second half of the dwell time allows consolidation or formation of the laminate, where the individual plies of prepreg 61 are drawn together or compacted into a volatile free and void-free laminate or composite 29.

It is important that at all times during the process that the vacuum in the outer chamber be maintained at a vacuum less than or equal to the vacuum in the inner chamber. In other words, it is essential that the vacuum in the outer chamber be held at approximately 0 to 2 inches of mercury below atmospheric pressure less than the vacuum maintained in the inner chamber. Theoretically, it is advisable to maintain as high or a perfect vacuum that can be obtained in the inner chamber. This is usually about 28 inches of mercury below atmospheric pressure or lower. The higher the vacuum in the inner chamber the better, i.e. below 28 inches of mercury with temperatures ranging up to 800° F. and preferably about 625° to 750° F. depending on the melting point of the particular thermoplastic resin used in the prepregs.

Figure 4B:
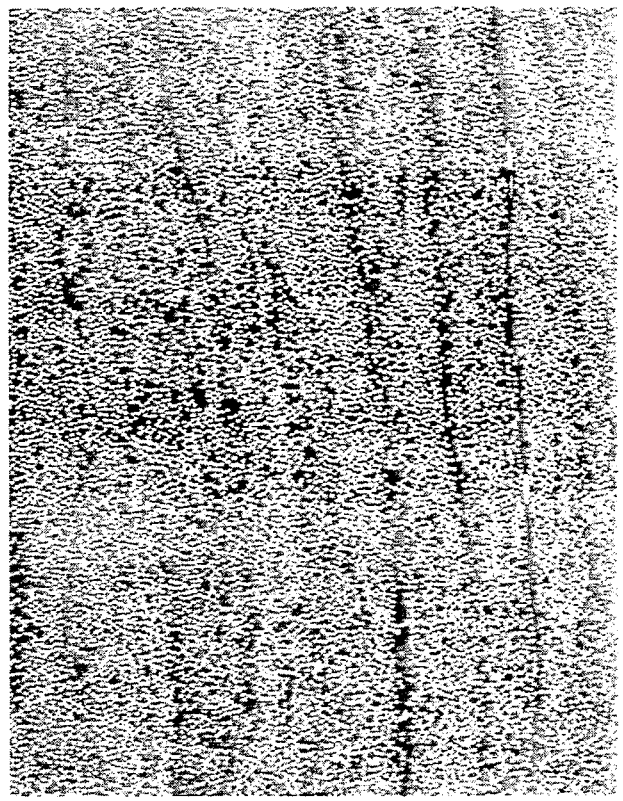
FIG. 4b shows a cross-sectional view, similar to that of FIG. 4a, taken after processing the prepregs in accordance with this invention.
Figure 4A:
FIG. 4a is a cross-sectional view taken along lines IV—IV of FIG. 2 of multiple plies of thermoplastic resin prepregs before being processed in accordance with the process of this invention.

Finally, the apparatus undergoes a cool-down period to a temperature below the melting point of the resin to allow the resin to solidify and crystallize. If necessary, a proper cool-down rate should be maintained, before releasing the vacuum from the inner chamber, to ensure proper crystallization and avoid the formation of amorphous micro-structures in semi-crystalline polymers. The laminates 29 formed in accordance with this invention has strength characteristics comparable to better than any of the laminates formed through high-pressure, autoclave consolidation. As shown in the drawings, FIGS. 4a and 4b are cross-sectional views taken along lines IV—IV of a plurality of prepregs. FIG. 4a is before and FIG. 4b is after the laminate is formed in accordance with this invention.

For purposes of this invention, various known polymeric thermoplastic resins maybe used to prepare the prepregs 61 provided the polymeric resins have melting points below about 800° F. These polymeric thermoplastic resins are well known in the prepreg art and include various polymers and copolymers such as the acrylics, amides, imides, and the olefin polymers e.g. isotactic polypropylene or styrene etc. In addition, other resins particularly useful for purposes of this invention include, for example, the polyether-ether ketones, polyaryl-ether sulfones (commercially known as Radel-X), the polyether-ketone copolymers (ITX) and the polyarylene ketones (HTX). These polymers have melting points ranging up to about 750° F., e.g. from about 500° to 750° F. Various fibers, including natural and synthetic fibers, known in the art may be used in combination with the resins including carbon fibers, glass fibers, metal fibers, asbestos fibers, polymeric fibers, etc. These fibers and resins are used to prepare the prepregs by various methods known in the art. The ratio's between the fibers and resins will vary depending on the use of the laminates e.g. from 10 to 90% by weight of resin.

This apparatus, by eliminating the need for a costly autoclave, enables a low pressure operation to take place and uses two, substantially independent vacuum chambers to remove trapped air and volatiles from the prepregs 61. In addition, the pulling of a vacuum under both chambers with the gap between the plies (prepregs) and the edge dam prevents individual plies from pinching off. Pinching off results in the entrapment of air and volatiles in the laminate thereby resulting in a poorly-formed product, rather than the preferred diffusion out of the edges. Moreover, at the edge, the gap allows a free path for the removal of inter- and intra-laminar volatiles from the laminate.

Finally, while the double chamber process and apparatus have been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What we claim is:

1. An apparatus for processing thermoplastic matrix composites, comprising:
   a. base means having a first vacuum source connected therethrough to hold unconsolidated piles of a prepreg;
   b. edge dam means surrounding said plies to prevent the pinching off of edges of the plies and to facilitate volatile removal;
   c. heat producing means to provide sufficient heat to the prepreg to melt thermoplastic resin contained therein to permit flow thereof;
   d. an air impervious bag enveloping the plies, said first vacuum source, said edge dam means and said heat producing means, and being hermetically sealed to said base means; and
   e. an air impervious rigid box hermetically sealed to said bag, having an interior and having a second vacuum source connected therethrough; wherein said air impervious bag is sealed to said base means adjacent the interior of said rigid box.

2. An apparatus as described in claim 1 wherein said base means comprises a plate having a flat surface.

3. An apparatus as described in claim 1 wherein said base means comprises a plate having a curved surface.

4. An apparatus as described in claim 1 wherein said edge dam means comprises steel bars.

5. An apparatus as described in claim 1 wherein said base means is made of steel.

6. An apparatus as described in claim 1 wherein said base means is made of ceramic.

7. An apparatus as described in claim 1 wherein said heat producing means comprises a resistance wire mesh.

8. An apparatus for achieving void-free consolidation of individual layers of thermo-plastic composite into a solid laminate, comprising:
   a. a base surface, for holding a laminate, of predetermined dimensions and having an aperture therein for rigid connection to a first vacuum source;
   b. edge dam bars forming, on said base surface, a closed loop around the laminate;
   c. an aluminum plate of predetermined size and thickness covering the laminate for providing a surface for even distribution of a pressing force;
   d. a heating blanket of predetermined size covering said aluminum plate;
   e. a section of glass fiber material of predetermined size covering said aperture, said edge dam bars, said aluminum plate and said heating blanket, to provide a breather ply;
   f. a flexible, air-impervious diaphragm of predetermined size covering and extending beyond said glass fiber material, and sealingly connected to said base surface;
   g. a rigid, air-impervious, open-ended box having an interior and being of smaller area than the area of said diaphragm, said rigid box being sealingly connected to said flexible diaphragm, wherein said diaphragm is sealed to said base surface; and adjacent the interior of said rigid box; and
   h. a second vacuum source connected to said rigid box.

9. An apparatus as described in claim 1 wherein said first and said second vacuum sources are connected through rigid members to said base means and said rigid box, respectively.

* * * * *